United States Patent [19]

Iwasaki

[11] 3,965,052

[45] June 22, 1976

[54] PROCESS FOR PREPARING LOW SMOKE-GENERATING RIGID FOAMS

[75] Inventor: Kazuo Iwasaki, Ohta, Japan

[73] Assignee: Kohkoku Chemical Industry Co., Ltd., Tokyo, Japan

[22] Filed: Apr. 24, 1974

[21] Appl. No.: 463,688

[30] Foreign Application Priority Data
Nov. 18, 1973  Japan.............................. 48-133819

[52] U.S. Cl..................... 260/2.5 AW; 260/2.5 AK; 260/2.5 AP
[51] Int. Cl.²......................................... C08G 18/48
[58] Field of Search................. 260/2.5 AW, 2.5 AK

[56] References Cited
UNITED STATES PATENTS

| | | | |
|---|---|---|---|
| 3,715,337 | 2/1973 | Allen............................ | 260/2.5 AW |
| 3,803,064 | 4/1974 | Fishbein....................... | 260/2.5 AW |

FOREIGN PATENTS OR APPLICATIONS

| | | | |
|---|---|---|---|
| 908,337 | 10/1962 | United Kingdom.......... | 260/2.5 AW |
| 1,155,768 | 6/1969 | United Kingdom.......... | 260/2.5 AW |
| 1,223,415 | 2/1971 | United Kingdom.......... | 260/2.5 AW |

*Primary Examiner*—C. Warren Ivy
*Attorney, Agent, or Firm*—Toren, McGeady and Stanger

[57] ABSTRACT

A process for preparing low smoke-generating rigid foams with a polyisocyanate, a polyol, a blowing agent, and a catalyst and surfactant, which comprises using an aromatic polyisocyanate as a polyisocyanate in the range between 3 to 5 times to the total amount of the compounds having active hydrogen in chemical equivalent, a polyol having a hydroxyl value less than 200 and containing more than 10% of primary hydroxyl groups, and water as a blowing agent in the amount of 2 to 6 parts by weight against 100 parts of above polyol together with catalysts suitable for isocyanate trimerization as the main catalyst.

7 Claims, No Drawings

PROCESS FOR PREPARING LOW SMOKE-GENERATING RIGID FOAMS

The present invention relates to a process for preparing low smoke-generating rigid foams which have thermal resistance and flame retardancy. Rigid plastic foams have been widely utilized as thermal insulating materials, light construction materials and floating materials because of their excellent properties. However, since they are composed of plastic materials, they have disadvantages in that they produce a great deal of smoke on thermal decomposition when burnt or heated to an elevated temperature, thus leading to their limited use as constructural material. Extensive investigations have been made to reduce the smoke on combustion.

Thus proposals were made, for example, wherein a solid carboxylic acid was added to a rigid polyurethane foam, and an inorganic filler was added to a polyolefin foam. These processes are intended to reduce the relative concentration of the plastic material by adding a second material to the reactant system, whatever the chemical reactions may be, to reduce the amount of evolved smoke. These processes are disadvantageous since they require the more complicated process due to the mixing step and because of the lowered shelf stability of the raw materials, and the lowered weathering and physical properties of the foams obtained. In this connection, the present inventor, who intensively investigated raw materials involved in the reactions and the chemical structures of the foams produced in the reaction to obtain a low smoke-generating foams without adding any second material to the reaction system, found the following facts:

1. Those rigid foams which contain a small number of urethane bondings, a large number of urea and biuret boundings and a moderate amount of isocyanurate bondings are low smoke-generating.
2. Polyols having no side chain, such as, methyl group react with polyisocyanate to give a low smoke-generating foam.
3. The amount of water added as a blowing agent is correlated with the smoke-generating property of the foams obtained.

The present inventor further investigated these problems and succeeded in solving them, and completed a process for preparing low smoke-generating rigid foams which are homogeneous and uniform in their physical properties without introducing a variety of complex materials to be mixed, nor which passes poor storage properties.

In other words, the present invention relates to a process for preparing low smoke-generating rigid foams from a polyisocyanate, polyol, blowing agent, catalyst and surfactant, comprising using an aromatic polyisocyanate as the polyisocyanate in the range between 3 to 5 times to the total amount of the compounds having active hydrogen in chemical equivalent, using a polyol having a hydroxyl value smaller than 200 and containing more than 10% of primary hydroxyl groups, using water as the blowing agent in the amount of 2 to 6 parts by weight against 100 parts of the polyol above together with catalysts suitable for isocyanate trimerization as the main catalyst.

In this invention, the amount of polyisocyanate is defined as 3 to 5 times as much as the total chemical equivalent of the active hydrogen compounds which are defined as having active hydrogen atoms determined by the Zerewitinoff's method. The active hydrogen compounds referred to here include polyols and water as constituting components of this invention, those amino compounds used as cross-linking agents and catalysts which contain primary and secondary amino groups, and phosphorus compounds which contain hydroxyl groups and/or primary or secondary amino groups. If the amount of polyisocyanate used does not suffice to reach 3 times as much in equivalent, the density of cross-linkage in the polymer becomes too small due to a deficiency in the isocyanurate and biuret bondings, and therefore the foams thus obtained may shrink at room temperature. On the other hand, however, as the amount of polyisocyanate increases, the rigid foams produced become harder and stronger with an accompanying increase in smoke-generation. Thus 5 times as much in chemical equivalent to the hydrogen compounds is the upper limit. In conclusion, the appropriate amount of polyisocyanate to be used in this invention is 3 to 5 times as much as the total quantity of the active hydrogen compounds in chemical equivalent.

Polyisocyanates are largely classified into aromatic and aliphatic polyisocyanates. The latter, in comparison with the former, are remarkably less reactive and the hardness and strength of the latter foams are too insufficient and the fire resistance of the same is too low to be employed to practical purposes.

Polyisocyanates which can be used in the present invention include the following compounds; tolylene-2,4-diisocyanate, tolylene-2,6-diisocyanate and a mixture thereof, either crude or purified diphenylmethane-4,4'-diisocyanate, 3-methyldiphenylmethane-4,4'-diisocyanate, m- and p-phenylenediisocyanate and naphthalene-1,5-diisocyanate. Polyisocyanates which can be used include either crude or pure polyisocyanates. A prepolymer having isocyanate groups at the ends which can be prepared by the reaction of an excess of polyisocyanate with a lesser amount of a polyol having more than 2 hydroxyl groups per molecule, can also be used in this invention. The combined use of more than two polyisocyanates is also possible.

Polyols which can be used in this invention should have the a hydroxyl value less than 200, preferably less than 150 and the a primary hydroxyl group content of greater than 10%, preferably 15%. The polyols are not restricted to be used singly, but may be used in combination of more than two. However, in this case the average hydroxyl value and the average value of the primary hydroxyl group contents of all the polyols must meet the above requirements.

As the hydroxyl value of the polyol used decreases, the amount of smoke generated becomes less and the foam produced therefrom becomes less brittle. If there exist a number of side chains, such as, methyl and ethyl groups which combine with the main chain of the methylene bonding formed in the polyols, they are readily liberated and decomposed to cause smoke-generation when the rigid foams are burnt or heated to an elevated temperature. Therefore the number of these side chains should be as small as possible. Consequently, the primary hydroxyl group content should be high. Considering the above fact and the reaction that occurs when a rigid foam is formed, the primary hydroxyl group content of the polyols is required to be higher than 10%, preferably 15%.

Polyols which are generally used to produce flexible, semi-rigid, and rigid polyurethane foams can be also used in the present invention if they satisfy the above mentioned requirements. An example thereof is a polyether polyol prepared by combining one or more alkylene oxides (such as ethylene oxide, propylene oxide and butylene oxide) with a reacton initiator (such as water, ethyleneglycol, glycerine, trimethylolpropane, pentaerythrit, ethylenediamine, sorbitol and sucrose). Another example is a polyester polyol having hydroxyl groups at the ends prepared by a condensation reaction of one or more polyhydroxyl alcohols (such as ethyleneglycol and trimethylolpropane) with one or more polycarboxylic acids (such as adipic, phthalic and succinic acids). One more example is a polymer polyol which can be prepared by graft polymerizing polyacrylonitrile to an aliphatic polyol. If necessary, a cross-linking agent of the amine type could be used, which is useful for adjusting both the reaction rate and the degree of cross-linking.

The amount of water used in this invention should be 2 to 6 parts, preferably 3 to 5 parts, by weight against 100 parts of polyol and a chlorofluoroalkane may be applied in combination with the water. A curve representing the relationship between the amount of water (against 100 parts of polyol) and the smoke generation of foam is approximately upwardly concave, and shows a minimum at about 3 to 4 parts by weight of water. The appropriate range of water is 2 to 6 parts.

When rigid foams are produced by the process of this invention, an amount of water of less than 2 parts against 100 parts by weight of polyol is inadequate since the formation of urea and biuret bondings diminishes relatively and the foams produced may shrink at room temperature owing to a lack of strength and rigidity of the foams. On the other hand, if the amount of water exceeds 6 parts, the increase in the strength can not compensate for the increase in smoke generation. Therefore the amount of water should be restricted to 2 to 6 parts in this invention.

The restricted amount of water, which also acts as a blowing agent, results in the restricted evolution of carbon dioxide which is generated by the reaction of water with polyisocyanate, thus the density of rigid foams can be slightly adjusted with ease. For the purpose of adjusting the density of rigid foams, chlorofluoroalkanes can be used together with the water. Chlorofluoroalkanes which could be used in the present invention include those used generally in preparation of polyurethane foams. Suitable chlorofluoroalkanes should be chemically inert toward the polyisocyanate and have a boiling point less than about 100°C, preferably from −50° to 70°C, under atmospheric pressure. They include methylene chloride, ethylene trichloride, trichloromonofluoromethane, dichlorodifluoromethane, dichloromonofluoromethane, dichlorotetrafluoroethane and dibromonofluoromethane.

In the present invention, use of the catalyst is essential to form trimers of the isocyanate, and catalysts to form urethane bonds and/or those to form urea bonds and/or biuret bonds are also permitted. Generally speaking, some catalysts which act in the information reactions of trimers of isocyanate also show catalytic activity in the formation of the urethane-, urea-, and/or biuret-bonds, and vice versa. These catalysts can not appropriately classified in different categories, but may be classified according to their most predominant catalytic tendencies, respectively, as is adopted here.

Catalysts which act to form trimers of isocyanate in the present invention include 2,4,6-tris(dimethylamonomethyl) phenol, o- and p-dimethylaminomethylphenol, N,N',N"-tris(dimethylaminopropyl)-sym-hexahydrotriazine, benzyltrimethylammonium methoxide, alkali metal salts of carboxylic acids (such as potassium acetate, potassium propionate, potassium octanate and potassium benzoate), alkali metal salts of weak acids other than carboxylic acids (such as, for example, potassium arsenate, sodium benzenesulfinate, potassium p-nitrophenolate), inorganic bases (such as sodium hydroxide and potassium hydroxide), sodium methoxide, salts of lead, cobalt, iron, cadmium and chromium.

Catalysts, which are liquid at room temperature may be used as is and mixed with the polyols, and those which are solid may be used conveniently either in the form of a solution prepared beforehand in water, dimethylformamide or dimethylsulfoxide, or in the form of fine powders kneaded with a roll-mill in a fraction or total quantity of the polyol.

Catalysts which act in forming the urethane bonds, urea bonds, and biuret bond are common to those which are used generally in preparation of polyurethane foams. These catalysts could be conveniently classifed into tertiary amines and organometallic compounds: tertiary amines include triethylamine, triethanolamine, diethanolamine, monoethanolamine, dimethylmonoethanolamine, triethylenediamine, tetramethylpropanediamine, tetramethyl-1,3-butanediamine, pentamethyldiethyltriamine; and organometallic compounds include, for example, dibutyl tin dilaurate, dibutyl tin diacetate, dibutyl tin dicaprylate, and stannous octate. Of course, they may be used either alone or in the combined use of more than two members. The amount used should be decided considering their reactivity.

As for the surfactants used in the present invention, the conventional ones which are useful in preparing polyurethane foams are suitable. For example, they are polyoxyalkylenes, such as, polyoxyalkylene alkylethers and polyoxyalkylene alkylaminoethers, silicones, such as, organo-polysiloxane and siloxane-oxyalkylene copolymers, and esters, such as, Turkey red oil.

The rigid foams prepared according to this invention are self-extinguishing as specified by ASTM D 1692-68, but a flame retardant may be applied if necessary. Flame retardants which may be used include tricresyl phosphate, tris(2-chloroethyl) phosphate, tris(-chloropropyl) phosphate, O,O-diethyl-N,N-bis(2-hydroxyethyl)aminomethyl phosphonate, metal oxides and chlorides, such as, antimony oxide, alumina and antimony oxychloride. Further, if necessary, coloring materials, such as, pigments and dyestuffs; inorganic fillers, such as, barium sulfate, calcium carbonate, calcium silicate, silica, calcium sulfate, calcium sulfite, aluminum sulfite; and inorganic fibers, such as, rock wool, asbestos and glass fibers may be used. When these materials are to be used, they may conveniently be mixed prior to mixing some of the other components of the composition.

The raw materials of this invention may be mixed and foamed by any method so far as the mixture can be mixed homogeneously. For example, a foaming machine with which polyurethane foams and epoxy foams are prepared can be applied conveniently. Foaming can be performed by injection, spraying and any other method. As the rigid foam layer is not sufficiently thick or the foam comes into contact with a metal plate, it is required to heat beforehand the reaction mixture and the metal plate.

In the following paragraphs features of the rigid foams of this invention will be explained.

1. In comparison with conventional rigid polyurethane and isocyanurate foams, the rigid foams of this invention generate much less or about one-third as much smoke.
2. Thermal resistance and flame retardancy of the present foams are higher than those of conventional rigid polyurethane foams and almost equal to those of the conventional isocyanurate foams.
3. The rigid foams of this invention are superior in flame retardancy, and therefore self-extinguishing as evidenced by ASTM D1692-68 even if no flame retardant such as phosphate is added.
4. The mechanical strengths, such as, compressive and flexural strength are of the same order of magnitude as those of conventional rigid polyurethane foams.

As has been shown above, the rigid foams of the present invention generate less smoke generating, and are superior in resistance against heat, flame retardancy, and strength. They can be employed widely as construction materials and moreover to any purposes for which rigid polyurethane and polystyrene foams have been applied.

The present invention will be illustrated by referring to the following examples, but the scope and aspect of this invention should be not restricted to the examples. In the examples, "parts" means "parts by weight", and "ratio in chemical equivalent" means "ratio in chemical equivalent of polyisocyanate to total amount of active hydrogen compounds which react with the former". As for physical properties of the foams obtained, the apparent density was measured according to ASTM D1622-63, the flammability test according to ASTM D 1692-68, and the smoke-generation test was performed according to JIS A 1321 using specimens 15 by 220 by 220 (mm) and expressed by the smoke-generation coefficient (denoted hereinafter by $C_A$).

EXAMPLES 1 THROUGH 5

The reaction mixtures shown in Table 1 were weighed in a 1-liter polyethylene beaker, agitated vigorously for 5 to 10 sec. in a cage-shaped mixer at room temperature (20° to 25°C), and foamed in a wooden box of which the upper side was open, to obtain rigid foams. The smoke-generation coefficient thereof was less than about a half as large as that of ordinary rigid polyurethane foams (approximately 50).

COMPARISON EXAMPLE 1

The reaction mixture shown in Table 1 was treated in the same manner as in Example 1. However, a foam was not obtained due to shrinkage of the material.

COMPARISON EXAMPLES 2 AND 3

Rigid foams could be produced by treating the reaction mixtures shown in Table 1 in the same manner as in Example 1. The smoke-generation coefficient thereof was either equally as large as, or larger than, that of ordinary rigid polyurethane foams.

Table 1

|  | Comparison Example 1 | Example 1 | 2 | 3 | 4 | 5 | Comparison Example 2 | 3 |
|---|---|---|---|---|---|---|---|---|
| Composition (in parts) | | | | | | | | |
| Crude MDI | 144 | 216 | 288 | 288 | 360 | 360 | 432 | 504 |
| Polyol A | 100 | 100 | 100 | 100 | 100 | 100 | 100 | 100 |
| Silicone oil | 1.0 | 1.0 | 1.0 | 1.0 | 1.0 | 1.0 | 1.0 | 1.0 |
| Potassium acetate | 3.0 | 3.0 | 3.0 | 3.0 | 3.0 | 3.0 | 3.0 | 3.0 |
| Water | 4.0 | 4.0 | 4.0 | 4.0 | 4.0 | 4.0 | 4.0 | 4.0 |
| Trichloromonofluoromethane | 15 | 25 | 20 | 30 | 40 | 50 | 70 | 83 |
| Ratio in chemical equivalent | 2 | 3 | 4 | 4 | 5 | 5 | 6 | 7 |
| Physical properties of foam | | | | | | | | |
| Apparent density (lb/ft$^3$) | ca.2.5 | 2.0 | 2.2 | 2.1 | 1.8 | 1.6 | 2.0 | 2.1 |
| Flammability property |  | Self-extinguishment | Self-extinguishment | Self-extinguishment | Self-extinguishment | Self-extinguishment | Self-extinguishment | Self-extinguishment |
| $C_A$ |  | 18 | 28 | 28 | 33 | 29 | 48 | 65 |
| Remark | Foam shrinked | | | | | | | |

Remarks:
Crude MDI: Crude material of diphenylmethane diisocyanate containing 31% of isocyanate group.
Polyol A: Polyether polyol prepared by the additional reaction of ethylene oxide and propylene oxide to pentaerythrit as initiator, containing about 20% of primary hydroxyl groups and having the hydroxyl value of 50.

In Table 1, the tendency is seen that the smaller the "ratio in chemical equivalent", or the smaller the excessive amount of polyisocyanate, the lower is the smoke-generation coefficient. The appropriate value of "ratio in chemical equivalent" should be 3 to 5 in order to make the smoke-generation coefficient smaller than 50, the value for ordinary flame retardant rigid polyurethane foams. The value smaller than 3 is not suitable since too low a density of cross-linkage may make the foam shrink at room temperature.

EXAMPLES 6 THROUGH 13

The reaction mixtures shown in Table 2 were treated in the same manner as in Example 1 to obtain rigid foams. The smoke-generation coefficient thereof was smaller than that of ordinary rigid polyurethane foams.

COMPARISON EXAMPLES 4 THROUGH 7

Rigid foams were obtained by treating the reaction mixtures shown in Table 2 in the same manner as in Example 1. The smoke-generation coefficient thereof was higher than that of the rigid foams in Examples 6 through 9.

Table 2

|  | Comparison Example 4 | Ex. 6 | 7 | 8 | 9 | Comparison Example 5 | 6 | Ex. 10 | 11 | 12 | 13 | Comparison Example 7 |
|---|---|---|---|---|---|---|---|---|---|---|---|---|
| Composition (in parts) | | | | | | | | | | | | |
| Crude MDI | 126 | 171 | 216 | 261 | 305 | 395 | 210 | 285 | 360 | 435 | 512 | 657 |
| Polyol A | 100 | 100 | 100 | 100 | 100 | 100 | 100 | 100 | 100 | 100 | 100 | 100 |
| Silicone oil | 1.0 | 1.0 | 1.0 | 1.0 | 1.0 | 1.0 | 1.0 | 1.0 | 1.0 | 1.0 | 1.0 | 1.0 |
| Potassium acetate | 3.0 | 3.0 | 3.0 | 3.0 | 3.0 | 3.0 | 2.5 | 2.5 | 3.0 | 5.0 | 6.0 | 9.0 |
| Water | 2.0 | 3.0 | 4.0 | 5.0 | 6.0 | 8.0 | 2.0 | 3.0 | 4.0 | 5.0 | 6.0 | 8.0 |
| Trichloromonofluoromethane | 35 | 30 | 25 | 15 | 10 | 0 | 54 | 45 | 40 | 35 | 30 | 20 |
| Ratio in chemical equivalent | 3 | 3 | 3 | 3 | 3 | 3 | 5 | 5 | 5 | 5 | 5 | 5 |
| Physical properties of foam | | | | | | | | | | | | |
| Apparent density (lb/ft$^3$) | 2.0 | 1.9 | 2.0 | 2.0 | 1.9 | 2.0 | 1.9 | 2.1 | 1.8 | 1.9 | 2.0 | 1.9 |
| Flammability property | Self-extinguishment | Self-extinguishment | Self-extinguishment | Self-extinguishment | Self-extinguishment | Self-extinguishment | Self-extinguishment | Self-extinguishment | Self-extinguishment | Self-extinguishment | Self-extinguishment | Self-extinguishment |
| $C_A$ | 30 | 21 | 18 | 24 | 29 | 35 | 40 | 30 | 33 | 39 | 42 | 47 |
| Remark | | Same as Ex. 1 | | | | | | Same as Ex. 4 | | | | |

In Table 2 the amount of water which was used as blowing agent was examined. The relation between the amount of water (relative to 100 parts of polyol) and the smoke-generation coefficient was roughly represented by a curve which was upwardly concave, on which a minimum was observed at 3 to 4 parts of water. The most appropriate range of water was 2 to 6 parts. For less than 2 parts of water, the degree of cross-linkage, such as, urea and biuret bondings diminished and the foams therefrom may shrink at room temperature.

EXAMPLES 14 TO 20

The reaction mixtures shown in Table 3 were treated in the same manner as in Example 1, to obtain rigid foams. The smoke-generation coefficient thereof was approximately less than a half of that for ordinary rigid polyurethane foams.

COMPARISON EXAMPLES 8 THROUGH 14

Rigid foams were produced by treating the reaction mixtures shown in Table 3 in the same manner as in Example 1 (except in Comparison example 9 where the materials did not gell, hence no rigid foam could be obtained). The smoke-generation coefficient was higher than that for the rigid foams in Examples 14 through 20.

Table 3

|  | Example 14 | 15 | 16 | Comparison Example 8 | 9 |
|---|---|---|---|---|---|
| Composition (in parts) | | | | | |
| Crude MDI | 288 | 326 | 278 | 271 | 293 |
| Polyol A | 100 | | 50 | 20 | |
| Polyol B | | 100 | | | |
| Polyol C | | | 50 | 80 | |
| Polyol D | | | | | 100 |
| Polyol E | | | | | |
| Polyol F | | | | | |
| Polyol G | | | | | |
| Polyol H | | | | | |
| Polyol I | | | | | |
| Polyol J | | | | | |
| Silicone oil | 1.0 | 1.0 | 1.0 | 1.0 | 5.0 |
| Potassium acetate | 3.0 | 8.0 | 3.0 | 3.0 | 6.0 |
| Water | 4.0 | 4.0 | 4.0 | 4.0 | 4.0 |
| Trichloromonofluoromethane | 30 | 40 | 30 | 30 | 25 |
| Tris(dimethylaminopropyl)hexahydro-s-triazine | | | | | |
| Ratio in chemical equivalent | 4 | 4 | 4 | 4 | 4 |
| Physical properties of foam | | | | | |
| Apparent density (lb/ft$^3$) | 2.1 | 1.7 | 1.8 | 1.9 | |
| Flammability property | Self-extinguishment | Self-extinguishment | Self-extinguishment | Self-extinguishment | |
| $C_A$ | 28 | 19 | 25 | 38 | |
| Remarks | Same as in Example 3 | | | | not gell |
| For reference Hydroxyl value of | | | | | |

Table 3-continued

| | Example 14 | 15 | 16 | Comparison Example 8 | 9 |
|---|---|---|---|---|---|
| polyol | 50 | 90 | 39 | 32 | 56 |
| Primary hydroxyl group content of polyol (%) | 20 | 60 | (15) | 4 | 0 |

| | Comparison Example 10 | Example 17 | 18 | Comparison Example 11 | 12 | 13 | 14 | Example 19 | 20 |
|---|---|---|---|---|---|---|---|---|---|
| | 293 | 347 | 400 | 472 | 830 | 670 | 580 | 325 | 325 |
| | | | | | | | | 50 | 50 |
| | 100 | | | | | | | | |
| | | 100 | | | | | | | |
| | | | 100 | | | | | | |
| | | | | 100 | | | | | |
| | | | | | 100 | | | | |
| | | | | | | 100 | | | |
| | | | | | | | 100 | 50 | 50 |
| | 5.0 | 1.0 | 1.0 | 1.0 | 1.0 | 2.0 | 2.0 | 2.0 | 2.0 |
| | 6.0 | 6.0 | 6.0 | 6.0 | 6.0 | 3.0 | 3.0 | 3.0 | 3.0 |
| | 4.0 | 4.0 | 4.0 | 4.0 | 4.0 | 4.0 | 4.0 | 4.0 | 4.0 |
| | 25 | 25 | 25 | 35 | 70 | 55 | 42 | 30 | 40 |
| | 5.0 | | | | | | | | |
| | 4 | 4 | 4 | 4 | 4 | 4 | 4 | 4 | 4 |
| | 2.0 | 2.0 | 1.8 | 2.1 | 1.8 | 1.8 | 2.0 | 1.9 | 1.7 |
| | Self-extinguishment | Self-extinguishment | Self-extinguishment | Self-extinguishment | Self-extinguishment | Self-extinguishment | Self-extinguishment | Self-extinguishment | Self-extinguishment |
| | 43 | 24 | 23 | 44 | 50 | 46 | 48 | 27 | 24 |
| | 56 | 100 | 170 | 290 | 420 | 450 | 355 | 200 | 200 |
| | 0 | 20 | 20 | 0 | 0 | 0 | 100 | 90 | 90 |

Remarks:
- Crude MDI: Same as in Example 1.
- Polyol A: Same as in Example 1.
- Polyol B: Polyether polyol prepared by adding EO and PO to glycerine as initiator, having the primary hydroxyl group content of about 60% and the hydroxyl value of 90.
- Polyol C: Polymer polyol prepared by graft polymerizing polyacrylonitrile to polyether polyol derived from a glycerine, having the hydroxyl value of 28.
- Polyol D: Polyether polyol prepared by adding PO to glycerine as initiator, having the hydroxyl value of 56.
- Polyol E: Polyether polyol prepared by adding EO and PO to glycerine as initiator, having the primary hydroxyl group content of about 20% and the hydroxyl value of 100.
- Polyol F: Same as Polyol E, having the primary hydroxyl group content of about 20% and the hydroxyl value of 170.
- Polyol G: Polyether polyol prepared by adding PO to glycerine as initiator, having the hydroxyl value of 90.
- Polyol H: Same as Polyol G, having the hydroxyl value of 420.
- Polyol I: Polyether polyol prepared by adding PO to sucrose as initiator, having the hydroxyl value of 450.
- Polyol J: Polyester polyol prepared by condensation reaction of adipic and phthalic acids as polycarboxylic acid with 1,4-butanediol and trimethylolpropane as polyhydroxyl alcohol to provide end hydroxyl groups, having the end hydroxyl value of 350.

(EO and PO, which show in the above description, mean ethylene oxide and propylene oxide, respectively.)

As can be seen in Table 3, polyols having lower hydroxyl values provide foams of lower smoke-generation coefficient.

EXAMPLE 21

A reaction mixture the same as that in Example 1 except 3.0 parts of potassium acetate replaced by 5 parts of N, N',N''-tris(dimethylaminopropyl)-hexahydro-symtriazine was used to obtain a foam in the same manner as above. The foam obtained was self-extinguishment and had an apparent density of 2.0 lb/ft$^3$ and a smoke-generation coefficient of 20.

EXAMPLE 22

The procedure in Example 1 was followed to obtain a foam with the same reaction mixture except crude MDI using crude toluene diisocyanate (containing 39% of isocyanate group) and with the "ratio in chemical equivalent" of 4. The foam obtained was self-extinguishing and had an apparent density of 1.8 lb/ft$^3$ and the smoke-generation coefficient of 17.

EXAMPLE 23

The reaction mixture in Example 3, to which 10 parts of tris(2-chloroethyl) phosphate was added, was treated to make foam in the same manner as before. The foam obtained was self-extinguishing and had an apparent density of 2.2 lb/ft$^3$ and smoke-generation coefficient of 30.

EXAMPLE 24

The reaction mixture, in which 3.0 parts of potassium acetate was reduced to 1.0 part and 4.0 parts of 2,4,6-tris(dimethylaminomethyl)phenol was added, was treated to foam in the same manner as before and obtained approximately the same foam.

What is claimed is:

1. In a process for preparing low smoke-generating rigid foams from a mixture of a polyisocyanate, a polyol, a blowing agent, a catalyst and a surfactant, the improvement which comprises using an aromatic polyisocyanate as the polyisocyanate in an amount from 3 to 5 times on the bases of chemical equivalent of the total amount of compounds having active hydrogen, and using a polyether polyol having an hydroxyl value of 69 to 200 and containing from 10 to 60 mole% of primary hydroxyl groups and using water as the blowing agent in an amount from 2 to 6 parts by weight per 100 parts of the polyol, together with an isocyanate trimerization catalyst.

2. The process according to claim 1, wherein the polyisocyanate comprises one or more aromatic polyisocyanates.

3. The process according to claim 1, wherein more than 2 polyols are used as the polyol and the average hydroxyl value thereof is less than 200 and the average value of the primary hydroxyl content is between 10 and 60 mole%.

4. The process according to claim 1, wherein a chlorofluoroalkane is used as the blowing agent in combination with water.

5. The process according to claim 1, wherein a tertiary amine, an organometallic compound or a mixture thereof is used as the catalyst in addition to the isocyanate trimerization catalyst.

6. The process according to claim 1, wherein a phosphoric ester, metal oxide, metal chloride or mixtures thereof are used as the flame retardant.

7. The process according to claim 1, wherein inorganic compounds and/or inorganic fibers are used.

* * * * *